(12) United States Patent
Mizuki et al.

(10) Patent No.: US 12,085,165 B1
(45) Date of Patent: Sep. 10, 2024

(54) ROTARY-LINEAR MOTION CONVERTER AND SHIFT ACTUATOR

(71) Applicant: NSK Ltd., Tokyo (JP)

(72) Inventors: Hironori Mizuki, Fujisawa (JP); Masayoshi Shimizuya, Fujisawa (JP); Susumu Tanaka, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/681,735

(22) PCT Filed: Jul. 20, 2023

(86) PCT No.: PCT/JP2023/026590
§ 371 (c)(1),
(2) Date: Feb. 6, 2024

(51) Int. Cl.
*F16H 63/06* (2006.01)
*F16H 25/22* (2006.01)

(52) U.S. Cl.
CPC ....... *F16H 63/062* (2013.01); *F16H 25/2219* (2013.01)

(58) Field of Classification Search
CPC . F16H 63/062; F16H 25/2219; F16H 25/2454
See application file for complete search history.

(56) References Cited

U.S. PATENT DOCUMENTS

2020/0018259 A1* 1/2020 Werquin ............... F02K 1/766

FOREIGN PATENT DOCUMENTS

| JP | 36-17614 Y | 7/1961 |
|----|------------|--------|
| JP | 51-120456 U | 9/1976 |
| JP | 2008-228557 A | 9/2008 |
| JP | 2009-095221 A | 4/2009 |
| JP | 2012-063009 A | 3/2012 |

OTHER PUBLICATIONS

Translation of International Search Report dated Sep. 5, 2023 in Application No. PCT/JP2023/026590.
Notice of Reasons for Refusal issued from Japanese Patent Application 2023-544136 issued on Aug. 25, 2023.
International Search Report for PCT/JP2023/026590 dated Sep. 5, 2023 (PCT/ISA/210).

* cited by examiner

*Primary Examiner* — Terence Boes
(74) *Attorney, Agent, or Firm* — Sughrue Mion, PLLC (57) ABSTRACT

A connecting structure includes a first member having a male screw portion on its outer-circumferential surface, a second member having a female screw portion on its inner-circumferential surface that is screwed with the male screw portion, a rotation restraining member placed between the first member and the second member and preventing relative rotation between the first member and the second member, and an elastic member applying elasticity in the axial direction between the first member and the second member.

11 Claims, 8 Drawing Sheets

OTHER SIDE IN THE AXIAL DIRECTION

ONE SIDE IN THE AXIAL DIRECTION

FIG. 7(A)

OTHER SIDE IN THE AXIAL DIRECTION ← → ONE SIDE IN THE AXIAL DIRECTION

FIG. 7(B)

OTHER SIDE IN THE AXIAL DIRECTION ← → ONE SIDE IN THE AXIAL DIRECTION

FIG. 8

ROTARY-LINEAR MOTION CONVERTER AND SHIFT ACTUATOR

CROSS REFERENCE TO RELATED APPLICATIONS

This application is a National Stage of International Application No. PCT/JP2023/026590 filed Jul. 20, 2023.

TECHNICAL FIELD

This disclosure relates to a connecting structure of two members which are connected by screwing a male screw portion into a female screw portion and whose relative rotation is prevented by a rotation restraining member, a rotary-linear motion converter having the connecting structure, and a shift actuator having the rotary-linear motion converter.

BACKGROUND ART

In outboard motors, the switching between forward and reverse is performed by switching engagement of a dog clutch with either gear of a forward gear or a backward gear each fixed to a propeller shaft through a wire or rod connected to a lever operated by an operator.

JP2008-228557(A) discloses an outboard motor that switches a dog clutch by an actuator using an electric motor as a driving source in order to reduce the force required for operators to operate the lever.

In the actuator of a board motor described in JP2008-228557(A), rotation of an output shaft (drive shaft) of the electric motor is converted into an linear motion in the axial direction of a nut by a ball screw device. The output shaft connected to the nut is connected to a camshaft through a link member and an operating shaft. As the camshaft moves in a linear motion, the dog clutch, which is supported by a propeller shaft so as to relatively move in the axial direction but not to relatively rotate, moves in a linear motion and engages with one of the forward gear and the backward gear.

Generally, a nut is made of iron-based alloys such as carbon steel and chromium molybdenum steel to ensure strength and rigidity, and an output shaft is made of light alloys such as aluminum alloys to reduce weight.

Similar to an actuator described in JP2012-063009(A), for example, the nut and the output shaft are connected by screwing a male screw portion provided on the outer-circumferential surface of the nut into a female screw portion provided on the inner-circumferential surface of the output shaft and placing a rotation restraining member (first output shaft support member) between the nut and the output shaft so as to prevent relative rotation between the nut and the output shaft.

CITATION LIST

Patent Literature

Patent Literature 1: JP2008-228557(A)
Patent Literature 2: JP2012-063009(A)

SUMMARY OF INVENTION

Technical Problem

In the actuator described in JP2012-063009(A), it is difficult to bring a stepped surface of the nut that faces in the axial direction into contact with an end surface in the axial direction of the output shaft for the following reasons (1) to (3):

(1) A circumferential phase of a through hole of the nut must coincide with a circumferential phase of a concave portion of the output shaft in order to place the rotation restraining member;
(2) Since a return tube is attached to the outer-circumferential surface of the nut, the mounting phase of the nut with respect to the housing must be regulated; and
(3) A circumferential phase of a tip-end portion of the output shaft must be regulated in order to be connected to the link member.

Figure 8:
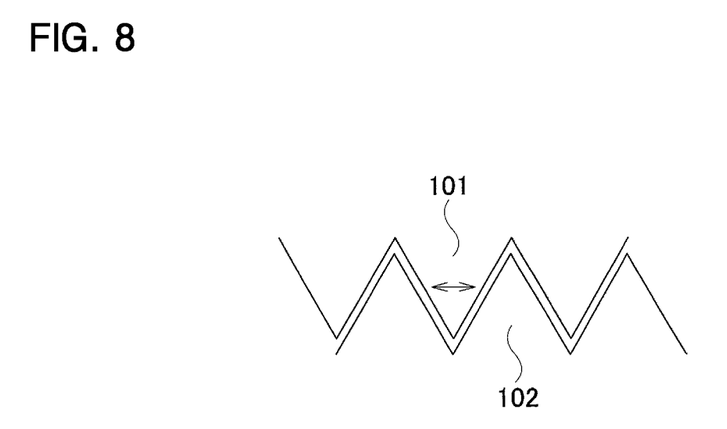
FIG. 8 is a schematic view illustrated to explain a problem of a conventional structure.

Since the stepped surface of the nut that faces in the axial direction and the end surface in the axial direction of the output shaft are not abutting, when the nut and the output shaft are not in linear motion, sufficient axial force is not acting on the screwed portion between the male screw portion and the female screw portion. Therefore, when the nut and/or the output shaft vibrate due to engine vibration, as illustrated in FIG. 8, there is a possibility that thread peaks of the male screw portion 101 and the thread peaks of the female screw portion 102 repeatedly collide with each other, causing wear on the male screw portion 101 and/or the female screw portion 102. In particular, since the female screw portion 102 is provided on the output shaft made of light alloys softer than the iron-based metal forming the nut, wear is easily generated.

The problem of difficulty in achieving bringing the stepped surface of the nut that faces in the axial direction into contact with the end surface in the axial direction of the output shaft may occur not only in structures that satisfy all of (1) to (3) but also in structures that satisfy any one or two of (1) to (3).

In addition, wear in the screwed portion between the male screw portion and the female screw portion is not limited to an actuator of outboard motors, but may occur in an environment where vibration occurs.

It is an object of the presend disclosure to achieve a connecting structure of two members that are connected by screwing the male screw portion and the female screw portion and are prevented from rotating relative to each other by a rotation restraining member, in which wear is less likely to occur in the screwed portion, a rotary-linear motion converter having the connecting structure, and a shift actuator having the rotary-linear motion converter.

Solution to Problem

A connecting structure of one aspect of the present disclosure includes:
- a first member having a male screw portion on an outer-circumferential surface thereof;
- a second member having a female screw portion on an inner-circumferential surface thereof that is screwed with the male screw portion;
- a rotation restraining member placed between the first member and the second member and preventing relative rotation between the first member and the second member; and
- an elastic member applying elasticity in an axial direction between the first member and the second member.

In a connecting structure of one aspect of the present disclosure, the direction of the elasticity may be a direction in which the first member and the second member relatively move away from each other in the axial direction.

In this case, the outer-circumferential surface of the first member can be configured by a stepped cylindrical surface including a small diameter portion arranged on one side in the axial direction, a large diameter portion arranged on the other side in the axial direction, and a stepped surface connecting an end portion on the other side in the axial direction of the small diameter portion and an end portion on the one side in the axial direction of the large diameter portion, the male screw portion can be formed in the small diameter portion, and the elastic member can be arranged between the stepped surface and the end surface on the other side in the axial direction of the second member.

The elastic member may be configured by an elastic ring or a wave washer.

In the connecting structure of one aspect of the present disclosure, the first member may have a first locking portion that is open at least in the outer-circumferential surface, the second member may have a second locking portion penetrating in a radial direction, and the rotation restraining member may have a stopper portion placed between the first locking portion and the second locking portion.

A rotary-linear motion converter of one aspect of the present disclosure includes:

a housing;

a ball screw mechanism including a screw shaft having a spiral shaft-side ball screw groove on an outer-circumferential surface thereof, a nut having a spiral nut-side ball screw groove on an inner-circumferential surface thereof, and a plurality of balls rollingly arranged in a load path consisting of the nut-side ball screw groove and the shaft-side ball screw groove; and an output shaft that is supported so as to move in the axial direction with respect to the housing but not to relatively rotate.

In particular, in the rotary-linear motion converter of one aspect of the present disclosure, one of the screw shaft and the nut configures a linear motion member that undergoes a linear motion during use, and the other of the screw shaft and the nut configures a rotary member that undergoes a rotary motion during use, and the linear motion member and the output shaft are connected by a connecting structure of one aspect of the present disclosure.

In a rotary-linear motion converter of one aspect of the present disclosure, the linear motion member can be configured by the first member, and the output shaft can be configured by the second member. In this case, the male screw portion provided on the linear motion member and the female screw portion provided on the output shaft are screwed together, and the rotation restraining member is placed between the first engagement portion provided on the linear motion member and the second engagement portion provided on the output shaft.

Alternatively, the linear motion member can be configured by the second member, and the output shaft can be configured by the first member. In this case, the female screw portion provided on the linear motion member and the male screw portion provided on the output shaft are screwed together, and the rotation restraining member is placed between the second engagement portion provided on the linear motion member and the first engagement portion provided on the output shaft.

In the rotary-linear motion converter of one aspect of the present disclosure, the linear motion member can be configured by the nut, and the rotary member can be configured by the screw shaft.

In this case, the nut may include a nut body having the nut-side ball screw groove, and a return tube attached to the nut body to return the plurality of balls from a start point to an end point of the load path.

Alternatively, the linear motion member can be configured by the screw shaft, and the rotary member can be configured by the nut.

A shift actuator of one aspect of the present disclosure includes:

an electric motor having a motor output shaft;

a rotary-linear motion converter that converts a rotary motion input to a rotary member into a linear motion in an axial direction of an output shaft; and a speed-reducing mechanism that transmits the rotary motion of the motor output shaft to the rotary member.

In particular, in the shift actuator of one aspect of the present disclosure, the rotary-linear motion converter is configured by a rotary-linear motion converter of the present disclosure.

Advantageous Effect of Invention

With the connecting structure and the rotary-linear motion mechanism of one aspect of the present disclosure, it is possible to prevent the occurrence of wear at the screwed portion between the male screw portion and the female screw portion.

DESCRIPTION OF EMBODIMENTS

A connecting structure of one embodiment of the present disclosure includes a first member having a male screw portion on an outer-circumferential surface thereof, a second member having a female screw portion on an inner-circumferential surface thereof that is screwed with the male screw portion, a rotation restraining member placed between the first member and the second member and prevents relative rotation between the first member and the second member, and an elastic member that applies elasticity in the axial direction between the first member and the second member.

As an example of an embodiment of the present disclosure, an example of applying the connecting structure of one embodiment of the present disclosure to a connecting structure between the nut 15 and the output shaft 4 configuring a rotary-linear motion converter 1 used in a shift actuator of an outboard motor will be explained with reference to FIG. 1 to FIG. 7(B).

In this example, the nut 15 configures a linear motion member as well as a first member. Further, the screw shaft 14 configures a rotary member, and the output shaft 4 configures a second member.

However, when applying a connecting structure of one embodiment of the present disclosure to a connecting structure between the nut and the output shaft, it is also possible that the output shaft configures the first member and the nut configures the second member.

The connecting structure of one embodiment of the present disclosure may also be applied to a connecting structure between the screw shaft and the output shaft configuring a rotary-linear motion converter. In this case, the screw shaft configures a linear motion member and the nut configures a rotary member.

Further, a connecting structure of one embodiment of the present disclosure can be applied not only to the connecting structure between the linear motion member and the output shaft of the rotary-linear motion converter configuring the shift actuator of an outboard motor, but also to any structure as long as it is a connecting structure of two members that are connected by screwing the male screw portion and the female screw portion and are prevented from rotating relative to each other by a rotation restraining member.

For example, a connecting structure of one embodiment of the present disclosure can be applied to a rotary-linear motion converter used for shift actuators, such as those in automobile transmissions.

[Rotary-Linear Motion Converter]

The rotary-linear motion converter 1 of this example includes a housing 2, a ball screw mechanism 3, and an output shaft 4. The connecting structure is applied to the connecting structure between the nut 15 and the output shaft 4 configuring the ball screw mechanism 3. In this example, the first member is configured by the nut 15, and the second member is configured by the output shaft 4.

In the description below, the axial direction, the radial direction, and the circumferential direction, unless stated otherwise, refer to the axial direction, the radial direction, and the circumferential direction of the rotary-linear motion converter 1. The axial direction, the radial direction, and the circumferential direction of the rotary-linear motion converter 1 coincide with the axial direction, the radial direction, and the circumferential direction of the screw shaft 14, the axial direction, the radial direction, and the circumferential direction of the nut 15, and the axial direction, the radial direction, and the circumferential direction of the output shaft 4, respectively.

Figure 1:
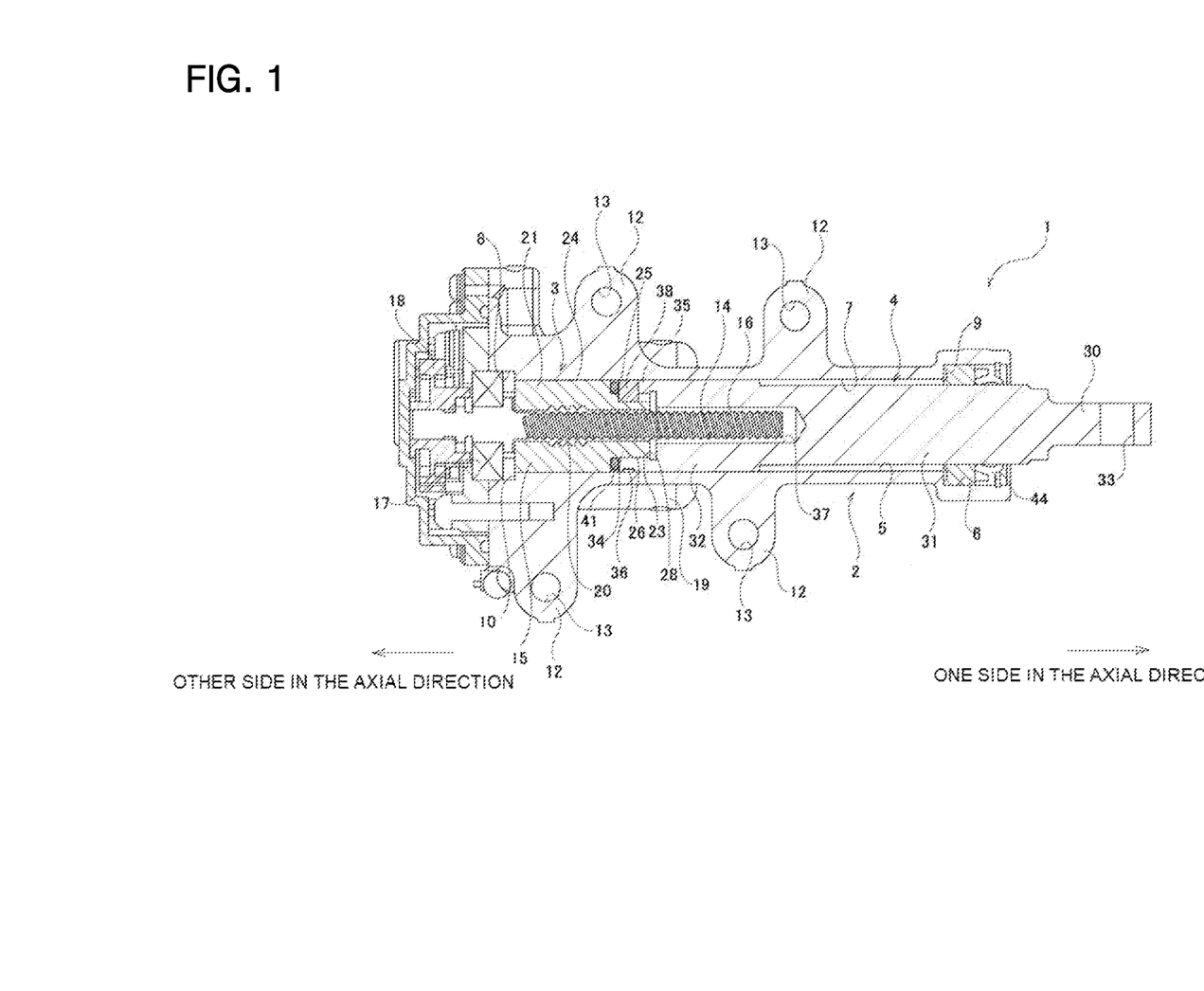
FIG. 1 is a cross-sectional view illustrating a rotary-linear motion converter of a first example of an embodiment of the present disclosure.
Figure 2:
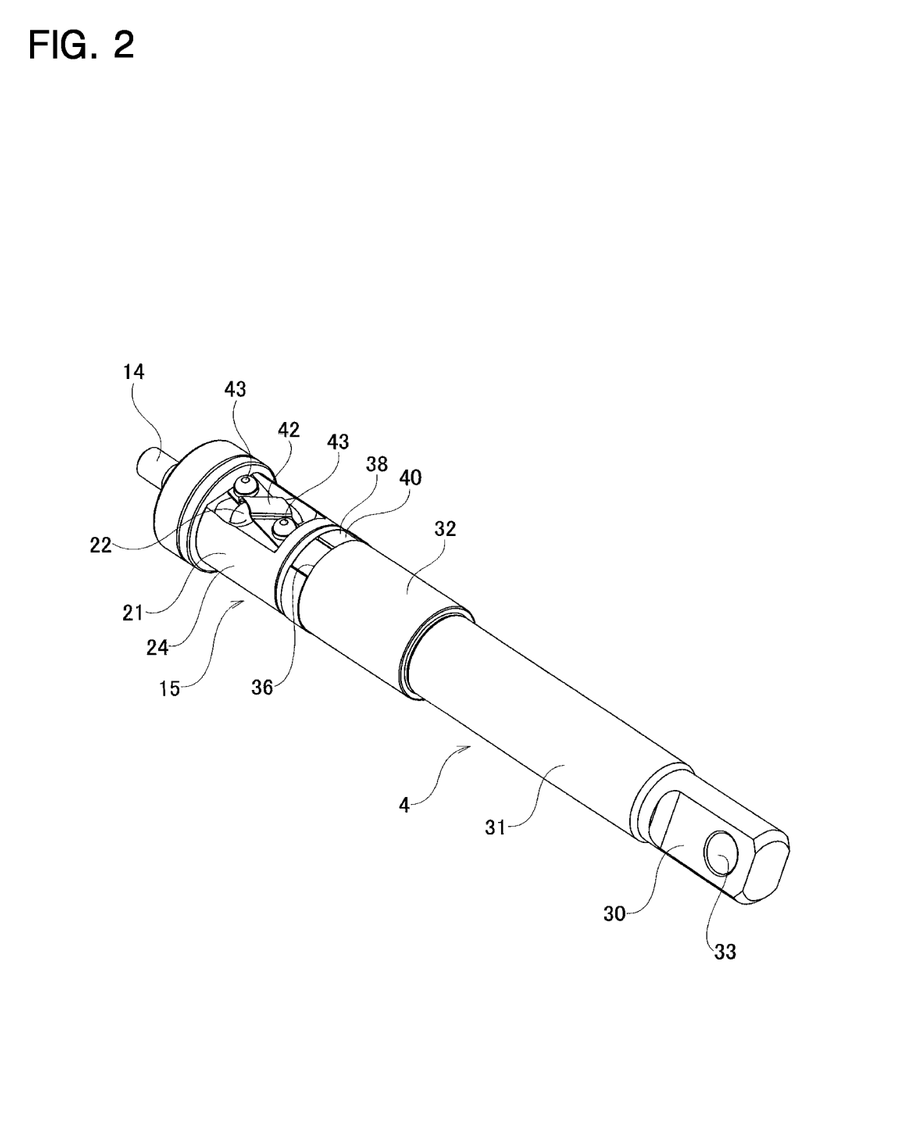
FIG. 2 is a perspective view of the rotary-linear motion converter illustrated in FIG. 1 with a housing removed.
Figure 3:
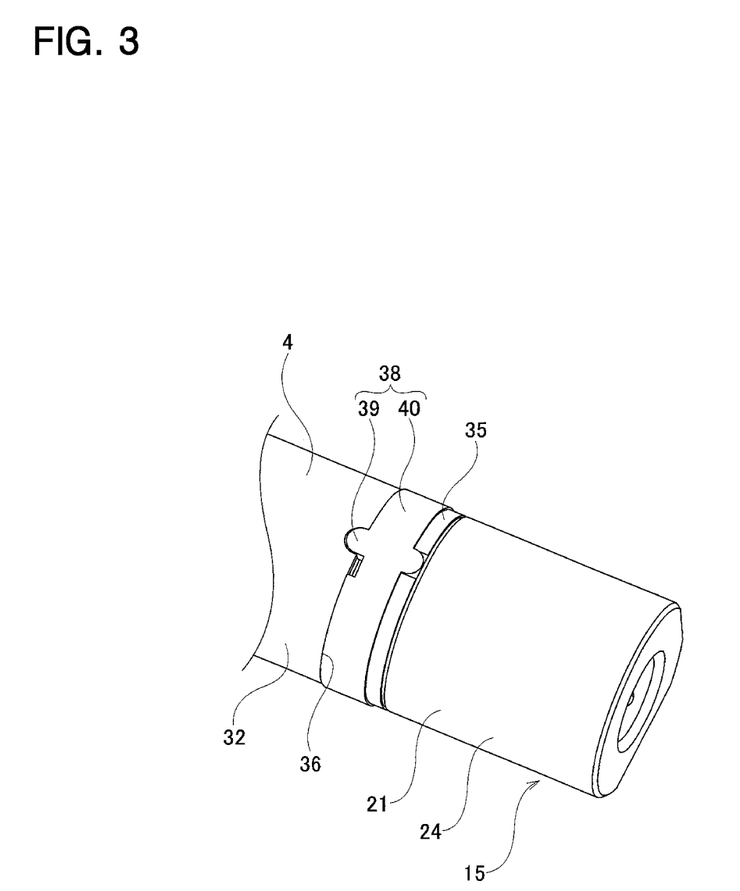
FIG. 3 is an enlarged perspective view illustrating a connecting section between the nut and the output shaft.
Figure 4A:
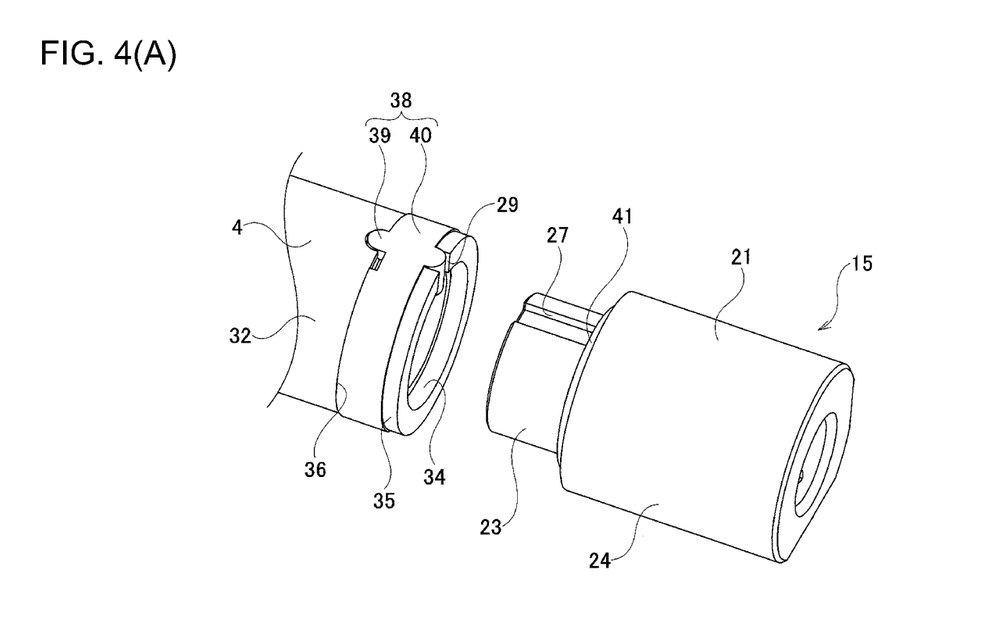
FIG. 4(A) is an isolated perspective view of a nut, an output shaft, a rotation restraining member, and an elastic member, illustrating a state before the nut and the output shaft are connected.
Figure 4B:
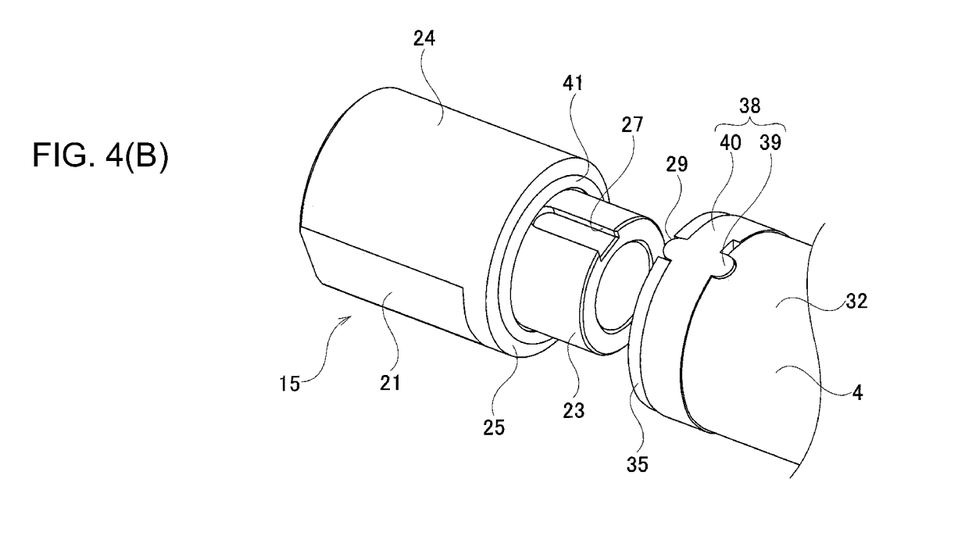
FIG. 4(B) is a perspective view as viewed from the opposite side in the axial direction of FIG. 4(A).
Figure 5:
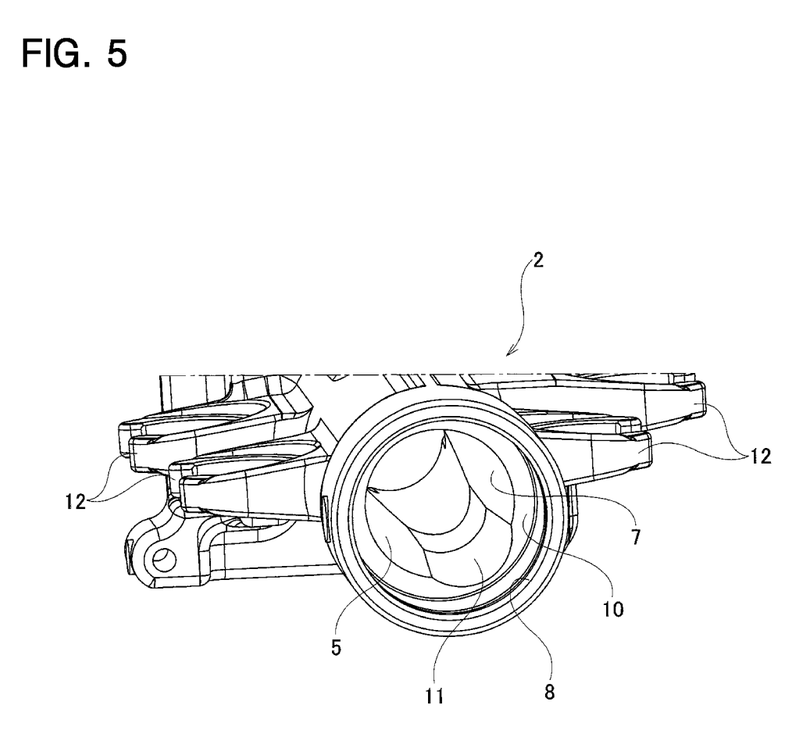
FIG. 5 is a perspective view of the housing as viewed from the left side of FIG. 1.
Figure 6:
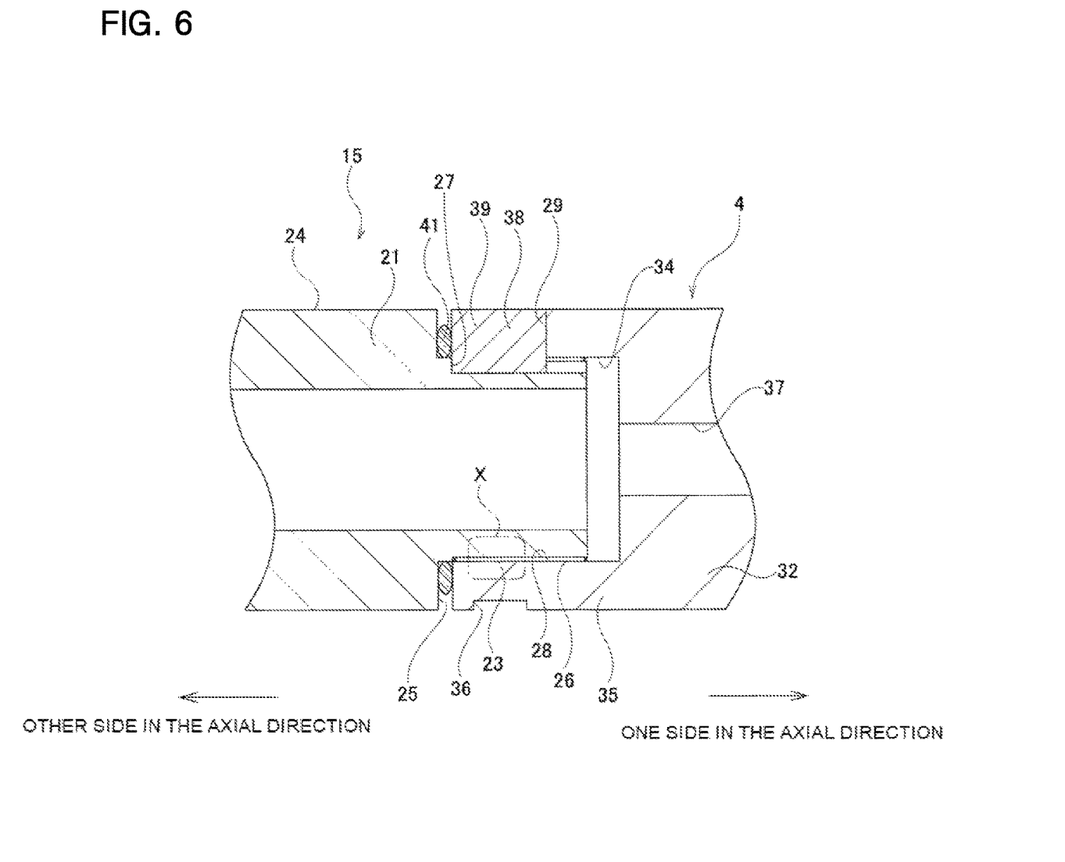
FIG. 6 is a cross-sectional view schematically illustrating the connecting section between the nut and the output shaft.

Further, one side in the axial direction represents the output shaft 4 side (right side in FIG. 1), and the other side in the axial direction represents the nut 15 side (left side in FIG. 1).

In this example, the housing 2 is configured in a cylindrical shape with openings on both sides in the axial direction. In other words, the housing 2 has a center hole 5 passing through the center in the axial direction.

The inner-circumferential surface of the center hole 5 has, in order from the one side in the axial direction, a first housing large diameter cylindrical surface portion 6, a housing small diameter cylindrical surface portion 7, and a second housing large diameter cylindrical surface portion 8.

The first housing large diameter cylindrical surface portion 6 has an inner diameter larger than an inner diameter of the housing small diameter cylindrical surface portion 7. Further, the second housing large diameter cylindrical surface portion 8 has an inner diameter smaller than the inner diameter of the first housing large diameter cylindrical surface portion 6 and larger than the inner diameter of the housing small diameter cylindrical surface portion 7. The inner diameter of the second housing large diameter cylindrical surface portion 8 can be the same as the inner diameter of the first housing large diameter cylindrical surface portion 6 or larger than the inner diameter of the first housing large diameter cylindrical surface portion 6.

An end portion on the other side in the axial direction of the first housing large diameter cylindrical surface portion 6 and an end portion on the one side in the axial direction of the housing small diameter cylindrical surface portion 7 are connected by a first housing stepped surface 9 facing toward the one side in the axial direction. An end portion on the one side in the axial direction of the second housing large diameter cylindrical surface portion 8 and an end portion on the other side in the axial direction of the housing small diameter cylindrical surface portion 7 are connected by a second housing stepped surface 10 facing toward the other side in the axial direction.

The housing 2 has a tube accommodating concave portion 11, which is concave toward outside in the radial direction, at one location in the circumferential direction of the housing small diameter cylindrical surface portion 7.

In this example, the tube accommodating concave portion 11 is formed on the housing small diameter cylindrical surface portion 7 in the axial direction. In other words, the end portion on the one side in the axial direction of the tube accommodating concave portion 11 opens to the first housing stepped surface 9, and the end portion on the other side in the axial direction of the tube accommodating concave portion 11 opens to the second housing stepped surface 10. However, it is also possible that the end portion on the one side in the axial direction of the tube accommodating concave portion 11 opens only to the first housing stepped surface 9, and the end portion on the other side in the axial direction of the tube accommodating concave portion 11 does not open to the second housing stepped surface 10.

The housing 2 is supported and fixed to a fixed portion such as a hull by bolts inserted through mounting holes 13 of a mounting flange portion 12 provided at a plurality of locations, and does not rotate or displace during use.

The ball screw mechanism 3 includes the screw shaft 14, the nut 15, and a plurality of balls (not illustrated).

The screw shaft 14 has a spiral shaft-side ball screw groove 16 on the outer-circumferential surface. In this example, the shaft-side ball screw groove 16 is provided on the one side portion in the axial direction of the outer-circumferential surface. The shaft-side ball screw groove 16 has a Gothic arch shaped or a circular arc shaped cross-sectional shape.

The screw shaft 14 is supported so as not to move in the axial direction and so as to relatively rotate with respect to the housing 2. In this example, a middle section in the axial direction of the screw shaft 14 is supported by the second housing large diameter cylindrical surface portion 8 of the housing 2 through a radial bearing 17.

In this example, the screw shaft 14 is configured so as to be rotatably driven by a motor output shaft of an electric motor 19 through a speed-reducing mechanism 18.

The nut 15 has a spiral nut-side ball screw groove 20 on the inner-circumferential surface. In this example, the nut-side ball screw groove 20 has a Gothic arch shaped or a circular arc shaped cross-sectional shape.

The nut 15 is arranged so as to move in the axial direction but not to relatively rotate with respect to the housing 2.

In this example, the nut 15 include a nut body 21 and a return tube 22.

The nut body 21 is made of iron-based metal such as carbon steel and chromium molybdenum steel and has a substantially cylindrical shape.

The nut-side ball screw groove 20 is provided on the inner-circumferential surface of the nut body 21.

The return tube 22 has a circulation path on the inside that connects a start point and an end point of a load path configured by the shaft-side ball screw groove 16 and the nut-side ball screw groove 20. Due to this, end portions on both sides of the return tube 22 are connected to end portions on the outside in the radial direction of two through holes that penetrate the nut body 21 in the radial direction. Each of the end portions on the inside in the radial direction of the through holes opens to end portions on both sides of the nut-side ball screw groove 20.

The balls are rotatably arranged in the load path and the circulation path.

In this example, when the screw shaft 14 is rotationally driven based on energization to the electric motor 19, the nut 15 moves linearly in the axial direction. At this time, the balls roll on the load path while circulating through the circulation path.

The output shaft 4 is connected and fixed to the nut 15. In this example, the output shaft 4 is arranged inside the housing 2 so as to move in the axial direction, and is connected and fixed to the one side in the axial direction of the nut 15.

In this example, the output shaft 4 is made of light alloys such as aluminum alloys to reduce weight.

In the case of embodying the present disclosure, the nut configuring the first member and the output shaft configuring the second member can be made of the same material. However, when the nut configuring the first member and the output shaft configuring the second member are made of different materials, the effects of the present disclosure can be obtained more noticeably than when they are made of the same material.

[Connecting Structure]

The connecting structure of this example includes the nut 15 configuring the first member, the output shaft 4 configuring the second member, a rotation restraining member 38, and an elastic member 41.

The nut 15 has a male screw portion 26 on the outer-circumferential surface.

The outer-circumferential surface of the nut body 21 configuring the nut 15 is configured by a stepped cylindrical surface including a small diameter portion 23 arranged on the one side in the axial direction, a large diameter portion 24 arranged on the other side in the axial direction, and a stepped surface 25 connecting an end portion on the other side in the axial direction of the small diameter portion 23 and an end portion on the one side in the axial direction of the large diameter portion 24. The large diameter portion 24 has an outer diameter slightly smaller than the inner diameter of the housing small diameter cylindrical surface portion 7 of the housing 2.

In this example, the male screw portion 26 is provided in the small diameter portion 23. Note that the thread peaks of the male screw portion 26 are omitted in FIG. 4(A) and FIG. 4(B).

The nut 15 has a first locking portion 27 that is open at least on the outer-circumferential surface.

In this example, the first locking portion 27 is open at one location in the circumferential direction of the small diameter portion 23. Specifically, the first locking portion 27 is configured by a concave portion that is open on an end surface on the one side in the axial direction of the nut body 21 and extends in the axial direction.

However, the first locking portion can also be configured by a concave portion that does not open on the end surface on the one side in the axial direction of the nut body. Alternatively, the first locking portion can also be configured by a notch that penetrates the nut in the radial direction and opens on the end surface on the one side in the axial direction of the nut, or a through hole that penetrates the nut in the radial direction and does not open on the end surface on the one side in the axial direction of the nut.

In this example, the return tube 22 is supported and fixed at one location in the circumferential direction of the large diameter portion 24 of the nut body 21 using a retaining jig 42 and screws 43.

The nut 15 is arranged inside the housing small diameter cylindrical surface portion 7 so that the return tube 22 is arranged inside the tube accommodating concave portion 11 and so as to move in the axial direction with respect to the housing 2 without looseness in the radial direction.

The nut 15 cannot relatively rotate with respect to the housing 2 by connecting a tip-end portion of the output shaft 4, which is connected to the one side in the axal direction of the nut 15 through the rotation restraining member 38 so as not to relatively rotate, to a link member or the like.

The output shaft 4 has a female screw portion 28 on the inner-circumferential surface that is screwed with the male screw portion 26 of the nut 15.

In this example, the output shaft 4 has, in order from the one side in the axial direction, a connecting shaft portion 30, a small diameter shaft portion 31, and a large diameter shaft portion 32.

The connecting shaft portion 30 has a substantially elliptical end surface shape when viewed from the axial direction. In this example, the connecting shaft portion 30 has a circular hole 33 penetrating in a minor axis direction. The connecting shaft portion 30 is connected to an end portion of the link member by a connecting member inserted through the circular hole 33.

The small diameter shaft portion 31 has a columnar shape, and has an outer diameter larger than the diameter of a circumscribed circle of the connecting shaft portion 30. In this example, a portion between the first housing large diameter cylindrical surface portion 6 of the housing 2 and the small diameter shaft portion 31 of the output shaft 4 is sealed by a sealing member 44 made of an elastomer such as rubber.

The large diameter shaft portion 32 has an outer diameter larger than the outer diameter of the small diameter shaft portion 31 and the same size as the outer diameter of the large diameter portion 24 of the nut 15. The large diameter shaft portion 32 has a concave portion 34 that opens to an end surface on the other side in the axial direction and has a circular opening shape when viewed from the axial direction.

In this example, the female screw portion 28 is provided on the inner-circumferential surface of the concave portion 34. In other words, the female screw portion 28 is provided on the inner-circumferential surface of a cylindrical portion 35 of the large diameter shaft portion 32 that exists on the outside in the radial direction of the concave portion 34.

The output shaft 4 has a second locking portion 29 that penetrates in the radial direction.

In this example, the second locking portion 29 is provided so as to penetrate one location in the circumferential direction of the cylindrical portion 35 in the radial direction. Specifically, the second locking portion 29 is configured by a notch which opens on the end surface on the other side in the axial direction of the cylindrical portion 35 and extends in the axial direction.

However, the second locking portion can also be configured by a through hole that does not open on the end surface on the other side in the axial direction of the cylindrical portion 35.

In this example, the output shaft 4 has a concave groove 36 on the outer-circumferential surface of the cylindrical portion 35 over the entire circumference. The concave groove 36 has a rectangular cross-sectional shape.

The output shaft 4 further has a bottomed hole 37 that opens at a bottom surface of the concave portion 34. The bottomed hole 37 is provided for inserting the one side portion in the axial direction of the screw shaft 14. In this example, the bottomed hole 37 is provided in a range of the output shaft 4 from a middle section in the axial direction of the large diameter shaft portion 32 to a portion on the other side in the axial direction of the small diameter shaft portion 31.

The rotation restraining member 38 prevents relative rotation between the output shaft 4 and the nut 15. In this example, the rotation restraining member 38 includes a stopper portion 39 and a base portion 40, and is integrally made of synthetic resin as a whole.

The stopper portion 39 is placed between the first locking portion 27 and the second locking portion 29. Specifically, the stopper portion 39 is inserted into the first locking portion 27 and the second locking portion 29 from the outside in the radial direction. In this example, the stopper portion 39 has a substantially elliptical end surface shape when viewed from the radial direction.

In this example, in a state where the stopper portion 39 is arranged inside the second locking portion 29, the dimensions and shape of the stopper portion 39 is regulated so that an end portion on the other side in the axial direction of the stopper portion 39 does not protrude from the end surface on the other side in the axial direction of the output shaft 4 toward the other side in the axial direction. This prevents the force that holds the elastic member 41 between the nut 15 and the output shaft 4 from becoming non-uniform in the circumferential direction.

In order to insert the stopper portion 39 of the rotation restraining member 38, in a state where the male screw portion 26 and the female screw portion 28 are screwed together and the circumferential phase of the first locking portion 27 and the circumferential phase of the second locking portion 29 are matched, the stepped surface 25 of the nut 15 and the end surface on the other side in the axial direction of the output shaft 4 do not come into direct contact with each other.

The base portion 40 is configured so as to be a partial cylinder having a discontinuous potion at one location in the circumferential direction, and extends in the circumferential direction so as to cross the end portion on the outside in the radial direction of the stopper portion 39. The base portion 40 is elastically fitted onto the bottom surface of the concave groove 36. As a result, the stopper portion 39 is prevented from falling off from the first locking portion 27 and the second locking portion 29.

However, the rotation restraining member is not limited to the structure of this example, and may have any structure as long as it can prevent relative rotation between the nut and the output shaft. For example, if it is possible to prevent from falling off from the first locking portion and the second locking portion, a rotation restraining member having a columnar or cylindrical shape as a whole which is made of an elastic material can be placed between the first locking portion and the second locking portion. Alternatively, the rotation restraining member can be configured by a cotter pin that is placed between the first locking portion and the second locking portion, each of which is configured by a through hole. Alternatively, a claw-shaped rotation restraining member provided on one of the nut and the output shaft can be locked in a concave portion provided on the other of the nut and the output shaft.

The elastic member 41 applies elasticity in the axial direction between the nut 15 and the output shaft 4.

In this example, the elastic member 41 is configured by an elastic ring called an O-ring, which is made of rubber and has a circular cross-sectional shape in a free state, and is elastically held between the stepped surface 25 of the nut 15 and the end surface on the other side in the axial direction of the output shaft 4.

In this example, as the elastic member 41 elastically recovers between the stepped surface 25 of the nut 15 and the end surface on the other side in the axial direction of the output shaft 4, a force is applied to the nut 15 and the output shaft 4 in a direction so as to relatively move the nut 15 and the output shaft 4 away from each other in the axial direction.

Figure 7A:
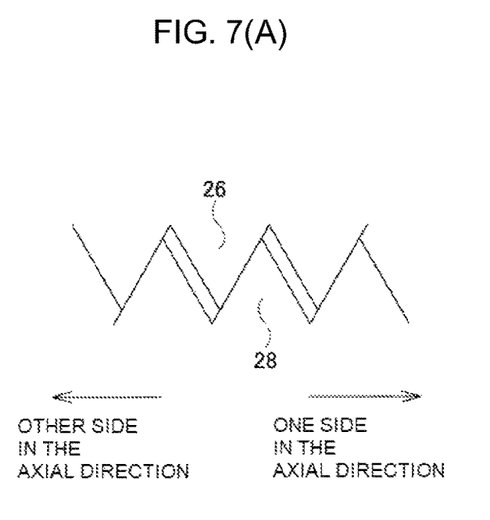
FIG. 7(A) is an enlarged view of the X part in FIG. 6 when the nut and the output shaft move toward one side in the axial direction.
Figure 7B:
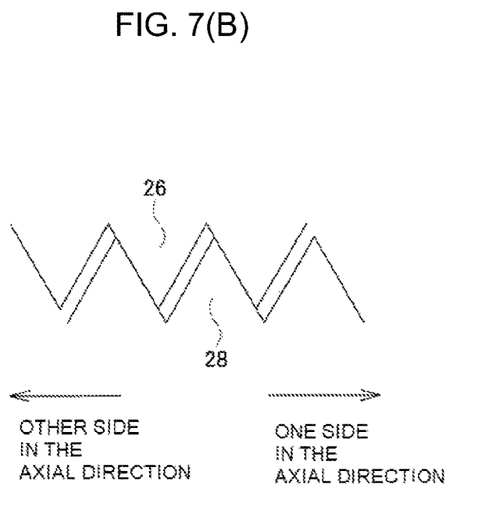
FIG. 7(B) is an enlarged view of the X part in FIG. 6 when the nut and the output shaft move toward the other side in the axial direction.

As a result, even when the nut 15 is not linearly moved, as illustrated in FIG. 7(B), surfaces of flank surfaces of the thread peaks of the male screw portion 26 facing toward the other side in the axial direction and surfaces of flank surfaces of the thread peaks of the female screw portion 28 facing toward the one side in the axial direction can be brought into elastic contact. Therefore, even when the nut 15 and/or the output shaft 4 vibrate due to engine vibration, it is possible to prevent the occurrence of wear in the male screw portion 26 and/or the female screw portion 28, especially at the female screw portion 28 provided on the output shaft 4 made of light alloys.

The elastic member can be configured by any member as long as it can apply elasticity in the axial direction to the nut and the output shaft. For example, the elastic member can be configured by an elastic ring made of rubber or a wave washer having a non-circular cross-sectional shape such as a rectangle Alternatively, the elastic member may be configured by a disc spring.

However, disc springs have a larger spring constant than elastic rings and wave washers, and the amount of change in elastic force with respect to the amount of compression is large.

In the connecting structure of this example, it is difficult to regulate the axial distance between the stepped surface 25 of the nut 15 and the end surface on the other side in the axial direction of the output shaft 4 with high precision for the following reasons (1) to (3):

(1) A circumferential phase of the first locking portion 27 of the nut 15 must coincide with a circumferential phase of the second locking portion 29 of the output shaft 4 in order to place the rotation restraining member 38;

(2) A circumferential phase of the return tube 22 of the nut 15 must coincide with a circumferential phase of the tube accommodating concave portion 11 of the housing 2; and (3) A circumferential phase of the connecting shaft portion 30 of the output shaft 4 must be regulated in order to be connected to the link member.

Therefore, in order to suppress the influence of a change in elastic force due to an error in the axial distance between the stepped surface 25 of the nut 15 and the end surface on the other side in the axial direction of the output shaft 4, the elastic member is preferably configured by an elastic ring or a wave washer.

Alternatively, the elastic member can be configured by a washer.

However, in order to press the stepped surface 25 of the nut 15 and the end surface on the other side in the axial direction of the output shaft 4 in a balanced manner in the circumferential direction, the elastic member is preferably configured by an elastic ring or a wave washer.

In the rotary-linear motion converter 1 of this example, when the screw shaft 14 is rotationally driven based on energization to the electric motor 19 and the nut 15 moves linearly in the axial direction, the output shaft 4 moves linearly in the axial direction together with the nut 15. The linear motion of the nut 15 is transmitted to the output shaft 4 through the screwed portion between the male screw portion 26 and the female screw portion 28. As the output shaft 4 linearly moves, the link member is pushed or pulled, and the traveling direction and/or the gears of the multi-stage transmission are changed.

When the nut 15 linearly moves toward the one side in the axial direction, as illustrated in FIG. 7(A), surfaces of the flank surfaces of the thread peaks of the male screw portion 26 facing toward the one side in the axial direction press surfaces of the flank surfaces of the thread peaks of the female screw portion 28 facing toward the other side in the axial direction toward the one side in the axial direction. As a result, the output shaft 4 also linearly moves toward the one side in the axial direction.

However, when the elastic force of the elastic member 41 is large, even when the nut 15 linearly moves toward the one side in the axial direction, the end surface on the other side in the axial direction of the output shaft 4 is pressed toward the one side in the axial direction by the stepped surface 25 of the nut 15 through the elastic member 41, so that the output shaft 4 linearly moves toward the one side in the axial direction. In this case, as illustrated in FIG. 7(B), the surfaces of the flank surfaces of the thread peaks of the male screw portion 26 facing toward the other side in the axial direction and the surfaces of the flank surfaces of the thread peaks of the female screw portion 28 facing toward the one side in the axial direction remain in contact with each other.

When the nut 15 linearly moves toward the other side in the axial direction, as illustrated in FIG. 7(B), surfaces of the flank surfaces of the thread peaks of the male screw portion 26 facing toward the other side in the axial direction press surfaces of the flank surfaces of the thread peaks of the female screw portion 28 facing toward the one side in the axial direction toward the other side in the axial direction. As a result, the output shaft 4 also linearly moves toward the other side in the axial direction.

In this example, an example has been explained in which the connecting structure of the present disclosure is applied to a structure where the nut 15 and the output shaft 4 are connected by screwing together the male screw portion 26 of the nut 15 and the female screw portion 28 of the output shaft 4. However, the connecting structure of the present disclosure can also be applied to a structure where the nut and the output shaft are connected by screwing together a female screw portion provided on the nut and a female screw portion provided on the output shaft.

REFERENCE SIGNS LIST

1 Rotary-linear motion converter
2 Housing
3 Ball screw mechanism
4 Output shaft
5 Center hole
6 First housing large diameter cylindrical surface portion
7 Housing small diameter cylindrical surface portion
8 Second housing large diameter cylindrical surface portion
9 First housing stepped surface
10 Second housing stepped surface
11 Tube accommodating concave portion
12 Mounting flange portion
13 Mounting hole
14 Screw shaft
15 Nut
16 Shaft-side ball screw groove
17 Radial bearing
18 Speed-reducing mechanism
19 Electric motor
20 Nut-side ball screw groove
21 Nut body
22 Return tube
23 Small diameter portion
24 Large diameter portion
25 Stepped surface
26 Male screw portion
27 First locking portion
28 Female screw portion
29 Second locking portion
30 Connecting shaft portion
31 Small diameter shaft portion
32 Large diameter shaft portion
33 Circular hole
34 Concave portion
35 Cylindrical portion
36 Concave groove
37 Bottomed hole
38 Rotation restraining member
39 Stopper portion
40 Base portion
41 Elastic member
42 Retaining jig
43 Screw
44 Sealing member

The invention claimed is:

1. A rotary-linear motion converter, including:
a housing;
a ball screw mechanism including a screw shaft having a spiral shaft-side ball screw groove on an outer-circumferential surface thereof, a nut having a spiral nut-side ball screw groove on an inner-circumferential surface thereof, and a plurality of balls arranged so as to roll in a load path consisting of the nut-side ball screw groove and the shaft-side ball screw groove; and an output shaft that is supported so as to move in an axial direction with respect to the housing but not to relatively rotate, wherein one of the screw shaft and the nut configures a linear motion member that undergoes a linear motion during use, and the other of the screw shaft and the nut configures a rotary member that undergoes a rotary motion during use, and the linear motion member and the output shaft are connected by a connecting structure, the connecting structure, including:

a first member, which is one of the linear motion member and the output shaft, having a male screw portion on an outer-circumferential surface thereof;

a second member, which is the other of the linear motion member and the out put shaft, having a female screw portion on an inner-circumferential surface that is screwed with the male screw portion;

a rotation restraining member placed between the first member and the second member and preventing relative rotation between the first member and the second member; and an elastic member applying elasticity in an axial direction between the first member and the second member.

2. The rotary-linear motion converter according to claim 1, wherein the direction of the elasticity is a direction in which the first member and the second member relatively move away from each other in the axial direction.

3. The rotary-linear motion converter according to claim 2, wherein the outer-circumferential surface of the first member is configured by a stepped cylindrical surface including a small diameter portion arranged on one side in the axial direction, a large diameter portion arranged on the other side in the axial direction, and a stepped surface connecting an end portion on the other side in the axial direction of the small diameter portion and an end portion on the one side in the axial direction of the large diameter portion, the male screw portion is formed in the small diameter portion, and the elastic member is held between the stepped surface and the end surface on the other side in the axial direction of the second member.

4. The rotary-linear motion converter according to claim 3, wherein the elastic member is configured by an elastic ring.

5. The rotary-linear motion converter according to claim 3, wherein the elastic member is configured by a wave washer.

6. The rotary-linear motion converter according to claim 1, wherein the first member has a first locking portion that is open at least in the outer-circumferential surface, the second member has a second locking portion penetrating in a radial direction, and the rotation restraining member has a stopper portion placed between the first locking portion and the second locking portion.

7. The rotary-linear motion converter according to claim 1, wherein the linear motion member is configured by the first member, and the output shaft is configured by the second member.

8. The rotary-linear motion converter according to claim 1, wherein the linear motion member is configured by the nut, and the rotary member is configured by the screw shaft.

9. The rotary-linear motion converter according to claim 8, wherein the nut includes a nut body having the nut-side ball screw groove, and a return tube attached to the nut body to return the plurality of balls from a start point to an end point of the load path.

10. The rotary-linear motion converter according to claim 1, wherein the first member and the second member are made of different materials.

11. A shift actuator, including an electric motor having a motor output shaft, a rotary-linear motion converter that converts a rotary motion input to a rotary member into a linear motion in an axial direction of an output shaft, and a speed-reducing mechanism that transmits the rotary motion of the motor output shaft to the rotary member, wherein the rotary-linear motion converter is configured by the rotary-linear motion converter according to claim 1.

* * * * *